(12) United States Patent
Gong et al.

(10) Patent No.: US 10,155,442 B2
(45) Date of Patent: Dec. 18, 2018

(54) ELECTRIC VEHICLE CHASSIS AND ELECTRIC VEHICLE USING SAME

(71) Applicant: SHENZHEN ZHILUN DRIVING TECHNOLOGY FOR ELECTRIC VEHICLE CO., LTD., Bao'an Shenzhen, Guangdong (CN)

(72) Inventors: Shugang Gong, Bao'an Shenzhen (CN); Xiaoling Li, Bao'an Shenzhen (CN); Zhen Li, Bao'an Shenzhen (CN); Dandan Luo, Bao'an Shenzhen (CN); Meng Zhang, Bao'an Shenzhen (CN)

(73) Assignee: SHENZHEN ZHILUN DRIVING TECHNOLOGY FOR ELECTRIC VEHICLE CO., LTD., Bao'An, Shenzhen (CN)

( * ) Notice: Subject to any disclaimer, the term of this patent is extended or adjusted under 35 U.S.C. 154(b) by 128 days.

(21) Appl. No.: 15/300,536

(22) PCT Filed: Apr. 1, 2014

(86) PCT No.: PCT/CN2014/074517
§ 371 (c)(1),
(2) Date: Sep. 29, 2016

(87) PCT Pub. No.: WO2015/149269
PCT Pub. Date: Oct. 8, 2015

(65) Prior Publication Data
US 2017/0151870 A1 Jun. 1, 2017

(51) Int. Cl.
*B62D 5/04* (2006.01)
*B60K 17/14* (2006.01)
(Continued)

(52) U.S. Cl.
CPC .............. *B60K 17/145* (2013.01); *B60K 1/02* (2013.01); *B60K 17/356* (2013.01);
(Continued)

(58) Field of Classification Search
CPC .... B62D 5/0472; B62D 21/152; B62D 21/02; B60K 7/0007; B60K 2007/0038
See application file for complete search history.

(56) References Cited

U.S. PATENT DOCUMENTS 6,378,637 B1 * 4/2002 Ono .................... B60K 1/04
180/65.31
7,292,992 B2 * 11/2007 Chernoff ............... B60G 7/003
705/26.1
(Continued)

FOREIGN PATENT DOCUMENTS

CN  101018692  8/2007
CN  201484168  5/2010
(Continued)

OTHER PUBLICATIONS

International Search Report issued in International Application No. PCT/CN2014/074517 dated Nov. 26, 2014 (2 pages).

*Primary Examiner* — Kevin Hurley
*Assistant Examiner* — Michael R Stabley
(74) *Attorney, Agent, or Firm* — Hamre, Schumann, Mueller & Larson, P.C.

(57) ABSTRACT

Disclosed are an electric vehicle chassis and an electric vehicle using the electric vehicle chassis. The electric vehicle chassis comprises a frame system (2), a steering motor damping system (13), a wheel system (12), a steering system (3) and a braking system (14), wherein the wheel system (12) comprises a left front wheel (121) using a hub motor, a left rear wheel (123) using a hub motor, a right front wheel (122) using a hub motor, and a right rear wheel (124) using a hub motor; and the steering motor damping system (Continued)

(13) comprises a left front steering damping motor (131), a right front steering damping motor (133), a left rear steering damping motor (135) and a right rear steering damping motor (137). Driving the wheels with the hub motors can omit a traditional mechanical transmission system, so as to simplify the structure of the chassis, reduce the weight of the chassis, and also reduce the mechanical transmission loss, thereby improving the power utilization efficiency.

18 Claims, 11 Drawing Sheets

(51) Int. Cl.
| | |
|---|---|
| *B62D 23/00* | (2006.01) |
| *B62D 25/02* | (2006.01) |
| *B62D 25/04* | (2006.01) |
| *B62D 25/20* | (2006.01) |
| *B62D 29/00* | (2006.01) |
| *B60K 1/02* | (2006.01) |
| *B60K 17/356* | (2006.01) |
| *B62D 21/15* | (2006.01) |
| *B62D 21/02* | (2006.01) |

(52) U.S. Cl.
CPC ......... *B62D 5/0418* (2013.01); *B62D 5/0472* (2013.01); *B62D 21/02* (2013.01); *B62D 21/155* (2013.01); *B62D 23/005* (2013.01); *B62D 25/025* (2013.01); *B62D 25/04* (2013.01); *B62D 25/2018* (2013.01); *B62D 25/2027* (2013.01); *B62D 29/008* (2013.01)

(56) References Cited

U.S. PATENT DOCUMENTS

| | | | | |
|---|---|---|---|---|
| 7,441,615 | B2* | 10/2008 | Borroni-Bird | B60G 3/18 180/58 |
| 7,951,483 | B2* | 5/2011 | Onuki | H01M 2/1016 320/116 |
| 8,056,928 | B2* | 11/2011 | Ijaz | B60K 15/013 280/830 |
| 8,282,275 | B2* | 10/2012 | Akaboshi | H01M 2/1077 320/134 |
| 8,710,800 | B2* | 4/2014 | Gibbs | H01M 10/441 320/116 |
| 2006/0027406 | A1* | 2/2006 | Borroni-Bird | B60K 1/04 280/831 |
| 2006/0048994 | A1* | 3/2006 | Young | B60G 3/18 180/402 |
| 2009/0267337 | A1* | 10/2009 | Siekaup | B62D 21/02 280/781 |

FOREIGN PATENT DOCUMENTS

| | | | | |
|---|---|---|---|---|
| CN | 202966436 | | 6/2013 | |
| CN | 203094172 | * | 7/2013 | ............... B60G 3/20 |

* cited by examiner

ELECTRIC VEHICLE CHASSIS AND
ELECTRIC VEHICLE USING SAME

TECHNICAL FIELD

The present invention belongs to the field of electric vehicles, and more particularly to an electric vehicle chassis and an electric vehicle using the electric vehicle chassis.

BACKGROUND

The existing electric vehicles generally use the motor to replace the traditional car engine, the battery is used to replace the fuel tank of the traditional vehicle, the chassis of the electric vehicle only be modified adaptively, the modification is small, and the chassis still uses the mechanical transmission system which has complicated structure and heavy weight, and will consume a lot of electric power from electric vehicle, and the mechanical transmission has energy loss, which would significantly reduce the electricity utilizing efficiency of the electric vehicle.

SUMMARY

The object of the present invention is to provide an electric vehicle chassis, to address the problem that existing electric vehicle uses the mechanical transmission system, which would significantly reduce the electricity utilizing efficiency of the electric vehicle.

The present invention is implemented by an electric vehicle chassis comprising a frame system, a steering motor damping system mounted on the frame system, a wheel system connected with the steering motor damping system, a steering system mounted on the frame system and a braking system mounted on the frame system, wherein the wheel system comprises a left front wheel using a hub motor, a left rear wheel using a hub motor, a right front wheel using a hub motor, and a right rear wheel using a hub motor; and the steering motor damping system comprises a left front steering damping motor, a right front steering damping motor, a left rear steering damping motor and a right rear steering damping motor; the left front steering damping motor and the right front steering damping motor are respectively disposed on a left side and a right side of a front end of the frame system, the left rear steering damping motor and the right rear steering damping motor are respectively disposed on the left side and the right side of a rear end of the frame system; the left front wheel is connected with the left front steering damping motor, the right front wheel is connected with the right front steering damping motor, the left rear wheel is connected with the left rear steering damping motor, the right rear wheel is connected with the right rear steering damping motor.

Another object of the present invention is to provide an electric vehicle comprising an electric motor vehicle chassis mentioned above.

The present invention uses the left front wheel, right front wheel, left rear wheel and right rear wheel each comprising a hub motor, that is the wheels are driven by the hub motors for driving, which can omit a traditional mechanical transmission system, so as to simplify the structure of the chassis, reduce the weight of the chassis, and also reduce the mechanical transmission loss, thereby improving the power utilization efficiency.

DETAILED DESCRIPTION OF THE EMBODIMENT

To make the objectives, technical solutions, and advantages of the present invention clearer and more comprehensible, the following further describes the present invention in detail referring to the accompanying drawings and embodiments. It should be understood that the specific embodiment described herein is merely used to explain the present invention but is not used to limit the present invention.

Figure 1:
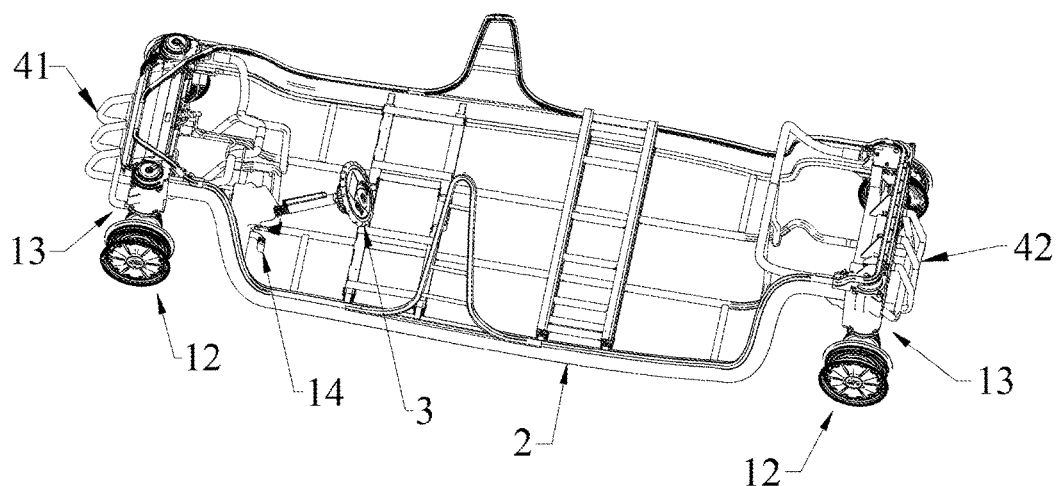
FIG. 1 shows a perspective view of an electric vehicle chassis according to an embodiment of the present invention.
Figure 2:
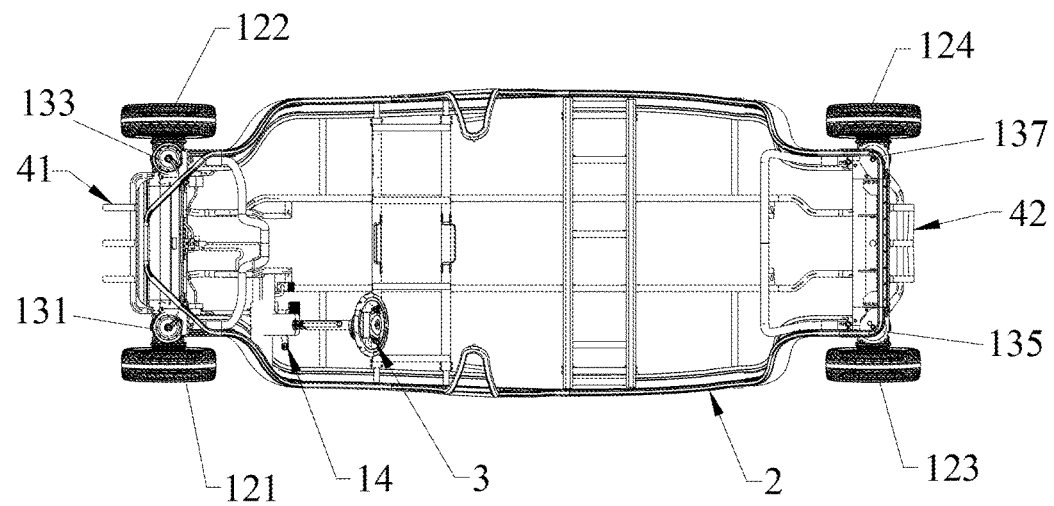
FIG. 2 is a top view of the electric vehicle chassis in FIG. 1.

Referring to FIGS. 1 and 2, an embodiment of the invention provides an electric vehicle chassis, the electric vehicle chassis comprises a frame system 2, a steering motor damping system 13 mounted on the frame system 2, a wheel system 12 connected with the steering motor damping system 13, a steering system 3 mounted on the frame system 2 and a braking system 14 mounted on the frame system 2. The wheel system 12 comprises a left front wheel 121 using a hub motor, a left rear wheel 123 using a hub motor, a right front wheel 122 using a hub motor, and a right rear wheel 124 using a hub motor. The steering motor damping system 13 comprises a left front steering damping motor 131, a right front steering damping motor 133, a left rear steering damping motor 135 and a right rear steering damping motor 137; the left front steering damping motor 131 and the right front steering damping motor 133 are respectively disposed on a left side and a right side of a front end of the frame system 2, the left rear steering damping motor 135 and the right rear steering damping motor 137 are respectively disposed on the left side and the right side of a rear end of the frame system 2. The left front wheel 121 is connected with the left front steering damping motor 131, the right front wheel 122 is connected with the right front steering damping motor 133, the left rear wheel 123 is connected with the left rear steering damping motor 135, the right rear wheel 124 is connected with the right rear steering damping motor 137.

The left front wheel 121, right front wheel 122, left rear wheel 123 and right rear wheel 124 each of which comprises a hub motor are used, that is the wheels are driven by the hub motors for driving, which can omit a traditional mechanical transmission system, so as to simplify the structure of the chassis, reduce the weight of the chassis, and also reduce the mechanical transmission loss, thereby improving the power utilization efficiency. The left front steering damping motor 131, right front steering damping motor 133, left rear steering damping motor 135 and right rear steering damping motor 137 are used to respectively adjust the steering of the left front wheel 121, right front wheel 122, left rear wheel 123 and right rear wheel 124, to adjust the rotation of each wheel. The hub motors may be the existing hub motors such as the hub motor disposed by the application with the publication number WO 2013107040 A1.

Figure 3:
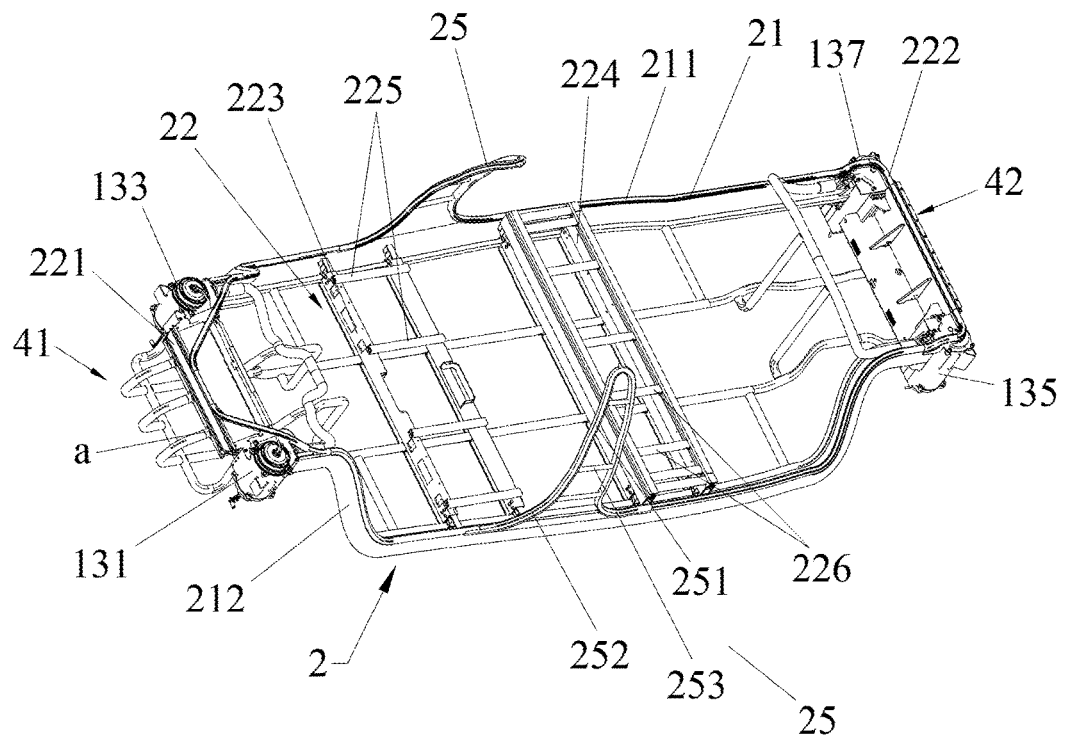
FIG. 3 is a perspective view of a frame system in FIG. 1 and also shows a front anti-collision system, a rear anti-collision system and a steering motor damping system.
Figure 4:
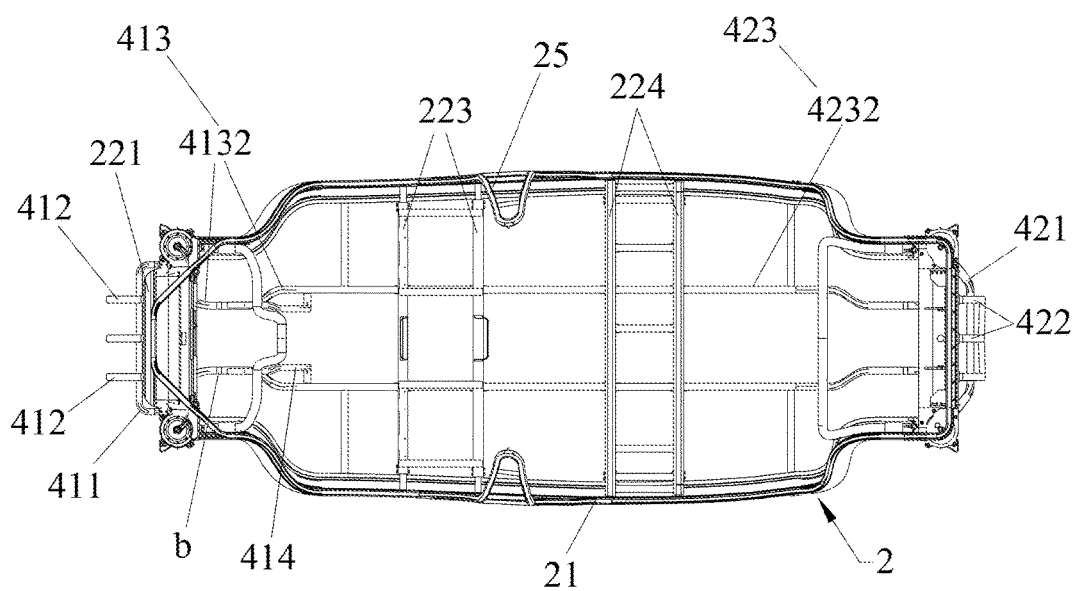
FIG. 4 is a top view of the frame system in FIG. 3.
Figure 5:
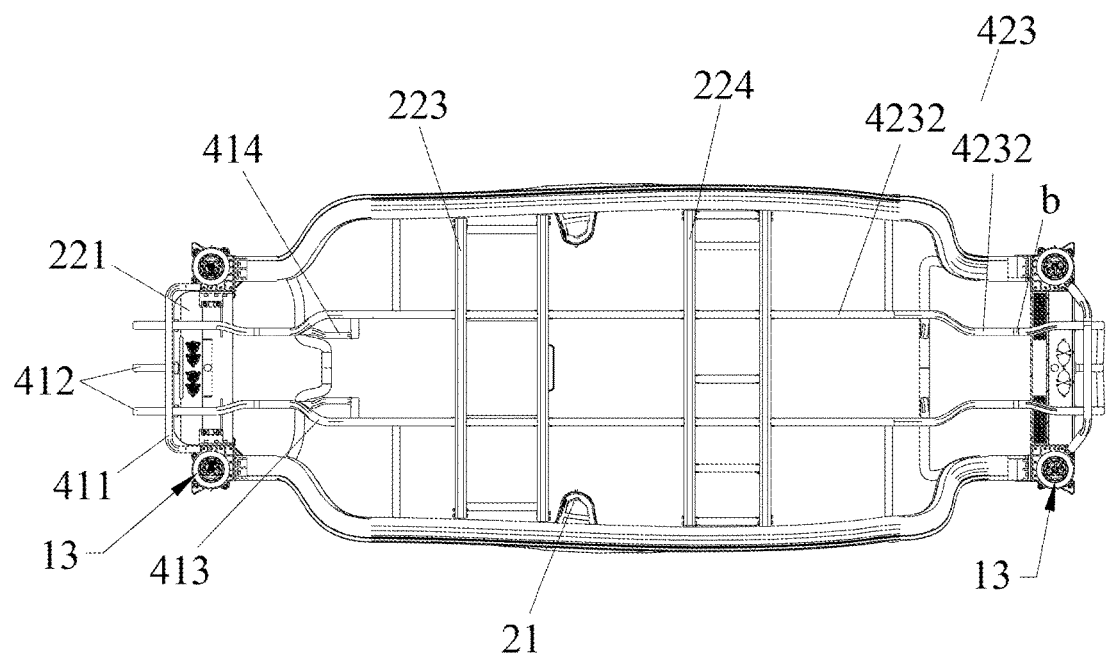
FIG. 5 is a bottom view of the frame system FIG. 3.
Figure 6:
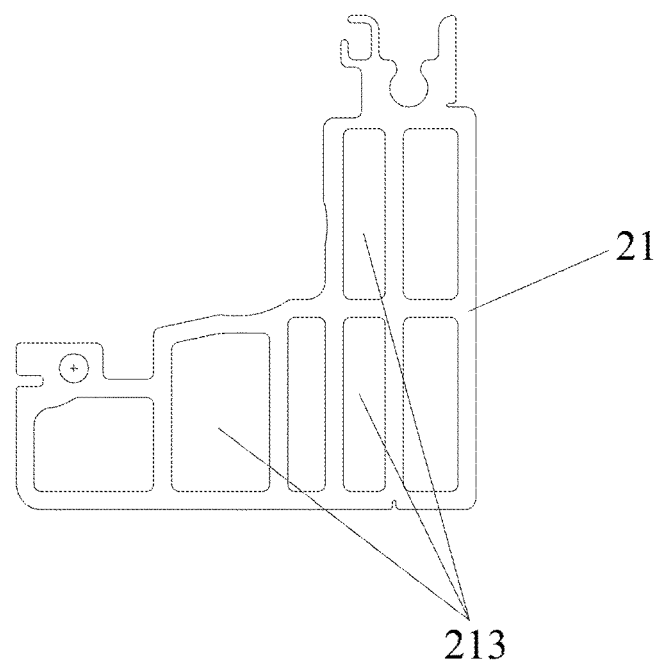
FIG. 6 is a cross-section view of the multi-cavity box stringers of the frame system in FIG. 3.

As shown in FIG. 3 to FIG. 5, the frame system 2 comprises two multi-cavity box stringers 21 spaced and symmetrically placed and made of aluminum alloy and a multi-cavity beam assembly 22 made of aluminum alloy and connected between the two multi-cavity box stringers 21. Specifically, referring to FIG. 6, an inner of the multi-cavity box stringer 21 is provided with a plurality of independent cavities 213, the multi-cavity beam assembly 22 comprises a plurality of beams each of which the inner is provided with a plurality of independent cavities, the cross-section of the multi-cavity box stringer 21 and the respective beam may be a rectangle, a circle or a polygon and so on. The multi-cavity box stringer 21 and the multi-cavity beam assembly 22 together form a support structure for the electric vehicle body, to support the vehicle body, and the plurality of independent cavities inside the multi-cavity box stringer 21 and the multi-cavity beam assembly 22 may not only reduce the overall weight of the frame, but also be used as cable channels, exhausting pipes or oil pipelines of the electric vehicle and so on.

The frame system 2 of the present invention further comprises a middle fixing frame 25 provided in the middle of the multi-cavity box stringer 25 and configured to fix a middle column of the electric vehicle. The number of the middle fixing frame 25 is two and the two middle fixing frames 25 are respectively provided in the middle of the two multi-cavity box stringers 25. The frame system 2 of the present invention only comprises the middle frame, and isn't provided with a fixing frame configured to fix a front column and the fixing frame configured to fix a rear column, and thus has a simpler structure than the structure of the frame of the conventional electric vehicle. In particular, the multi-cavity box stringer 21 comprises a middle portion 211 and curved portions 212 disposed on both ends of the middle portion 211, middle portion 211 can be smooth such that the electric vehicle body is stable, thereby providing a comfortable driving environment. Of course, the middle portion 211 may also have an arc shape with a convex in the middle to make the vehicle body more beautiful, and make the traversability of the vehicle better. In other embodiments, the middle portion 211 may have other shapes. The curved portion 212 are curved upward from the middle portion 211 toward positions diagonally above two opposite inner sides of the two multi-cavity box stringers 21 to facilitate mounting and accommodating the wheels.

The frame system of the present invention uses multi-cavity box stringers 21 and multi-cavity box beams which are made of aluminum alloy, which not only form the support structure for supporting the body of the electric vehicle and but also reduce the overall weight of the frame, and have simple structure and is easy to process molding, thereby greatly simplifying the production process and reducing production costs; further, since the multi-cavity box stringer 21 and the perspective beams have a plurality of independent cavities which may be used as cable channels, exhausting pipes or oil pipelines of the electric vehicle and so on, such that it doesn't need to specially provide a variety of channels such as cable channels, thereby simplifying the overall structure of the electric vehicle, simplifying the assembly of the electric vehicle, and also reducing the production costs.

The beams comprises a front beam 221 disposed on the front ends of the two multi-cavity box stringers 21, a rear beam 222 disposed on the rear ends of the two multi-cavity box stringers 21, middle beams 223 and combined beams 224 all of which are disposed on the middle of the two multi-cavity box stringers 21. That is the middle beams 223 and combined beams 224 are connected to the middle portion 21 of the multi-cavity box stringers 21, the front beam 221 and the rear beam 222 are respectively connected to the curved portions at two ends of the multi-cavity box stringers 21, each beam is disposed between the two multi-cavity box stringers 21 to form a main bearing structure of the trapezoid shaped frame system 2. Specially, the number of the middle beams 223 is two and the two middle beams 223 are spaced, the number of the combined beams 224 is two and the two combined beams 224 are spaced. Furthermore, to support the seats of the electric vehicle stably, the middle beams 223 and the combined beams 224 may be positioned on the portions where the front seats and the rear seats are mounted in the electric vehicle, thereby supporting the seats stably. The left front steering damping motor 131 and the right front steering damping motor 133 are mounted on opposite ends of the front beam 221, the left rear steering damping motor 135 and the right rear steering damping motor 137 are mounted on the opposite ends of the rear beam 222.

Figure 7:
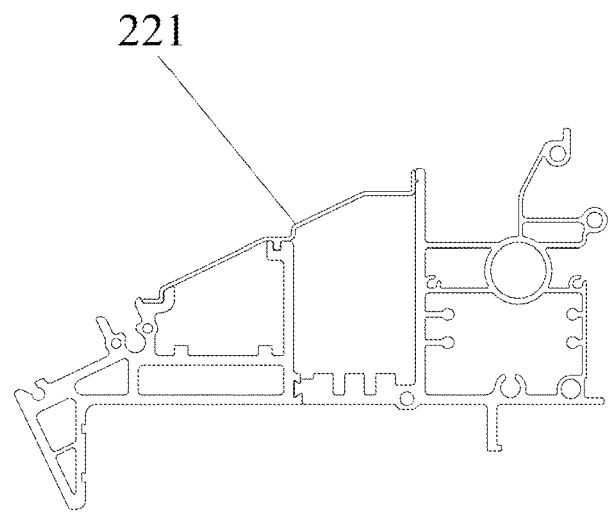
FIG. 7 is a cross-section view of the front beam of the frame system in FIG. 3.
Figure 8:
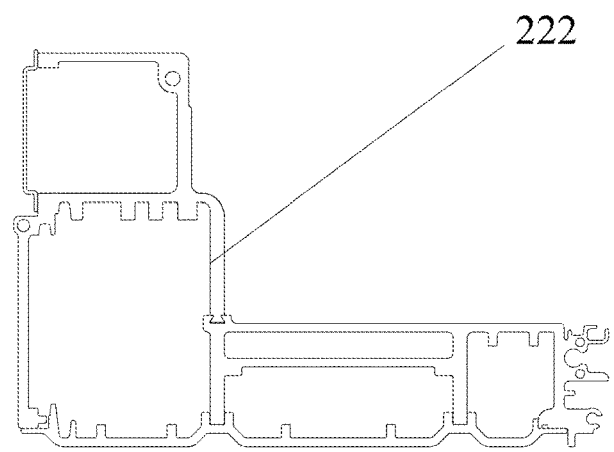
FIG. 8 is a cross-section view of the rear beam of the frame system in FIG. 3.

To enhance the buffer and shock-absorbing capacity of the front beam 221 and the rear beam 222, the front beam 221 and the rear beam 222 may be provided with multi-cavity structure, that is the inner of the front beam 221 and the rear beam 222 is provided with a plurality of independent cavities, as shown in FIGS. 7 and 8, the cross-section views of the front beam 221 and the rear beam 222 are respectively shown, and outer walls of the front beam 221 and the rear beam 222 may be provided with mounting slots or mounting holes or the like for mounting other parts.

To enhance the structural strength of the two middle beams 223 and increase the overall structural stability of the frame system 2, a plurality of first reinforcing rods 225 may be provided between the two middle beams 223 to strengthen the beams 223 and the overall stability of the frame system 2, the first reinforcing rod 225 may also be formed with a multi-cavity structure.

Similarly, a plurality of second reinforcing rods 226 may be provided between the two combined beams 224 to strengthen the beams 223 and the overall stability of the frame system 2

Figure 9:
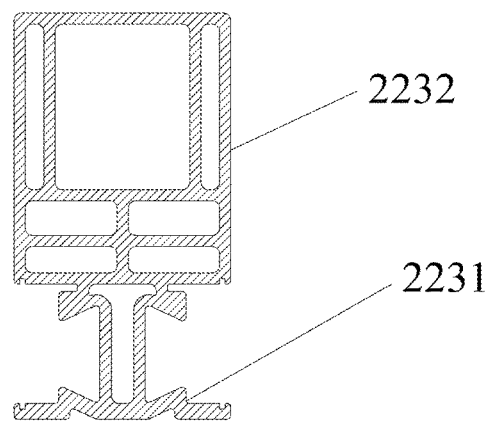
FIG. 9 is a cross-section view of the middle beam of the frame system in FIG. 3.
Figure 10:
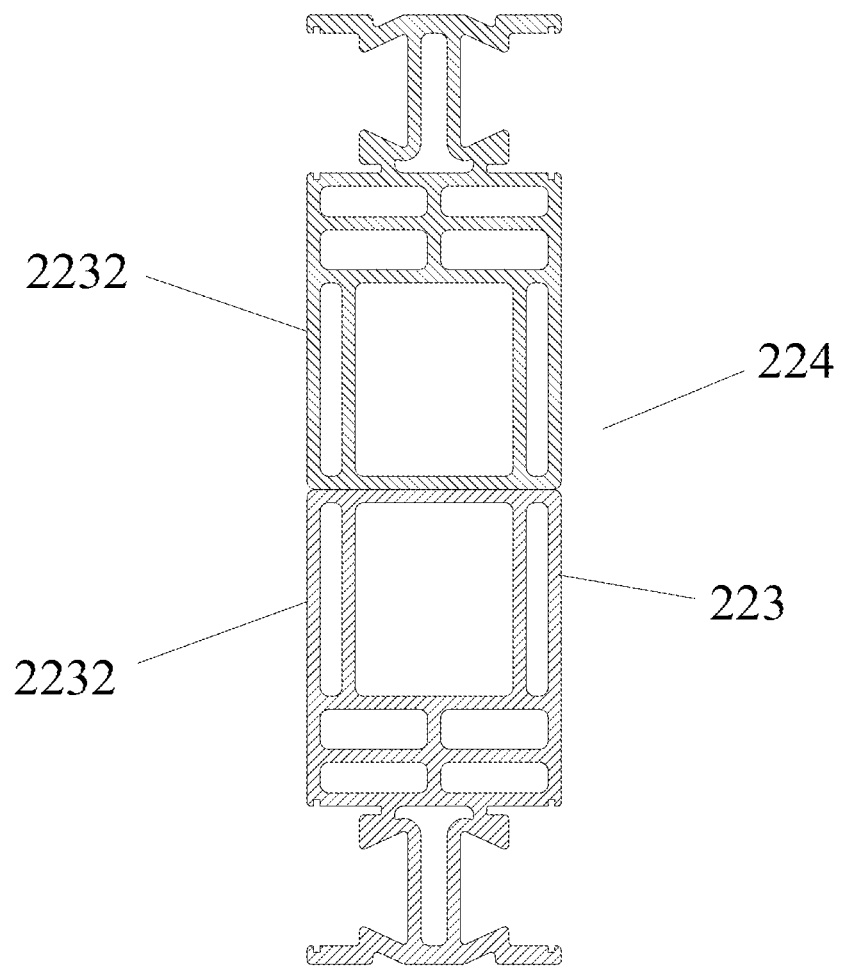
FIG. 10 is a cross-section view of the combined beam of the frame system in FIG. 3.

Specifically, as shown in FIG. 9, the middle beam 223 comprises a base portion 2231 with the cross-section of inverted "π" shape, a rectangular portion 2232 provided on the base portion 2231 and integrally with the base portion 2231; the rectangular portion 2232 comprises a plurality of independent cavities.

Similarly, the cavities inside the base portion 2231 and the rectangular portion 2232 may be used as cable channels, ventilation pipes, oil pipelines, etc., to let the attachments of the electric vehicle or the like pass through, thus enhancing space utilization, and simplifying the overall structure of the electric vehicle. Further, as shown in FIG. 9, in the this embodiment, the inner of the middle beam 223 is provided with eight independent cavities, cross section of the cavity may has the shape of rectangular, T-shape or circular shape. Of course, the number and cross section of the cavities is not limited.

As shown in FIG. 8, the combined beams 224 are respectively formed by stacking two middle beams 223, the stacking manner is that the two rectangle portions of the middle beams 223 of two middle beams 223 are oppositely dispose, that is the combined beams 224 are axisymmetric, such that the inner of the combined beams 224 also has a plurality of independent cavities which also can be used as cable channels, ventilation pipes, ventilation pipes, oil pipelines and the like.

The middle fixing frame 25 comprises a U-shaped base portion 251, two arcuate portions 252 provided on both ends of the U-shaped base portion 251, the two arcuate portions 252 are bent outwardly, and the two arcuate portions 252 are connected to the multi-cavity box stringers 21, the middle fixing frame 25 is configured to fix the middle column of the electric vehicle, the U-shaped base portion is provided with a rib 253 in the middle, for strengthening the strength and structural stability of the intermediate fixing frame 25. The frame system 2 of the present invention only comprises the middle frame, and isn't provided with a fixing frame configured to fix a front column and the fixing frame configured to fix a rear column, and thus has a simpler structure and is easy to assemble.

The electric vehicle chassis also comprises a front anti-collision system 41 provided at the front end of the multi-cavity box stringer 21, the front anti-collision system 41 comprises a front crossbar 411 connected with the front beam 221, a front bumper 412 with two ends respectively connected to the front crossbar 411 and the front beam 221, and the front bumper 412 is curved, the front bumper 412 is perpendicular to the front beam 221 and the front crossbar 411, the front bumper 412 is protruded outwardly with respective to the front crossbar 411, such that the front bumper 412 is firstly hit by the outer force upon collision. Further more, the front bumper 412 can also be arranged in a manner of a multi-cavity rod, thereby enhancing the buffer and anti-collision capacity thereof. Further, opposite inner sides of the front bumper 412 are provided with front damping cushions (not shown). Arranging the front damping cushions increases the anti-collision capacity of the chassis; the front damping cushion may be provided a power battery at the back to protect the power battery through the front damping cushion.

The ends of the front bumper 412 is connected to the front beam 221 through a shock-absorbing ring a to further enhance the anti-collision capacity of the front bumper 412, at least one first lever 413 is provided between the front crossbeam 411 and the middle beam 223. In this embodiment, the number of the first lever 413 is two, the first lever 413 is provided a first column 414 to enhance structure connection strength. Specifically, the first lever 413 may formed by two half levers 4132, the two levers may be connected through a shock-absorbing gel b, to enhance anti-collision capacity thereof.

The electric vehicle chassis also comprises a rear anti-collision system 42 provided at the rear end of the multi-cavity box stringer 21, the rear anti-collision system 42 comprises a rear crossbar 421 connected with the rear beam 222, a rear bumper 422 with two ends respectively connected to the rear crossbar 421 and the rear beam 222, and the rear bumper 422 is curved, the rear bumper 422 is perpendicular to the rear beam 222 and the rear crossbar 421, the rear bumper 422 is protruded outwardly with respective to the rear crossbar 421, such that the rear bumper 422 is firstly hit by the outer force upon collision. Further more, the rear bumper 422 can also be arranged in a manner of a multi-cavity rod, thereby enhancing the buffer and anti-collision capacity thereof. Further, opposite inner sides of the rear bumper 422 are provided with rear damping cushions (not shown). Arranging the rear damping cushions increase the anti-collision capacity of the chassis; the rear damping cushion may be provided a power battery at the front to protect the power battery through the rear damping cushion.

The present invention may use four groups of power batteries, as one group of the power batteries does not fail, the vehicle can travel as usual, thereby improving the reliability of the battery module, and such that the fault tolerance of the vehicle power failure mode is greatly improved. The front bumper 412 and the rear bumper 422 of the present invention may be arranged within a vehicle body covering member, in order to ensure vehicle appearance, prevent the power batteries, the front damping cushions or the rear damping cushions from exposing, to play the role of protecting the power batteries, the front damping cushions and the rear damping cushions and the like.

Figure 11:
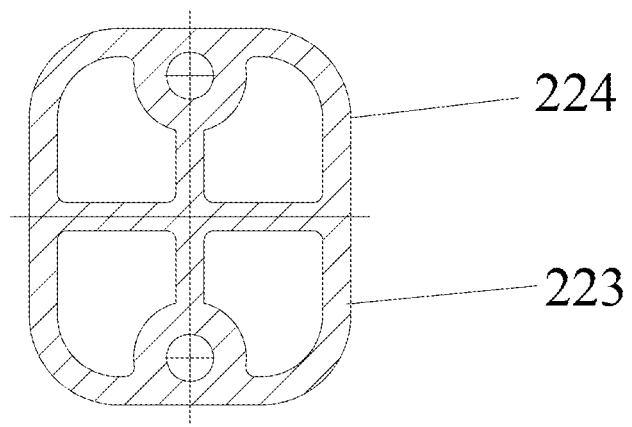
FIG. 11 is a cross-section view of the front bumper or the rear bumper of the frame system in FIG. 3.

As shown in FIG. 11, the cross section views of the front bumper 412 and the rear bumper 422 are shown, that is the inners of the front bumper 412 and the rear bumper 422 each have six independent cavities, the cross section of the cavity may have the shape of circle, polygon or the like; further, the first lever 413 can also be formed with the multi-cavity structure, the cross section of the first lever 413 may have the same shape as the front bumper 412 and the rear bumper 422.

The ends of the rear bumper 422 is connected to the rear beam 222 through the shock-absorbing ring a to further enhance the anti-collision capacity of the rear bumper 422, at least one second lever 423 is provided between the rear crossbeam 241 and the middle beam 224. In this embodiment, the number of the second lever 423 is two, the second lever 423 is provided with a second column 424 to enhance structure connection strength. Further, the second lever 423 may formed by two half levers 4232, the two levers may be connected through the shock-absorbing gel b, to enhance anti-collision capacity thereof. Similarly, the second lever 423 be formed with the multi-cavity structure, the cross section of the second lever 423 may have the same shape as the front bumper 412 and the rear bumper 422.

Figure 12:
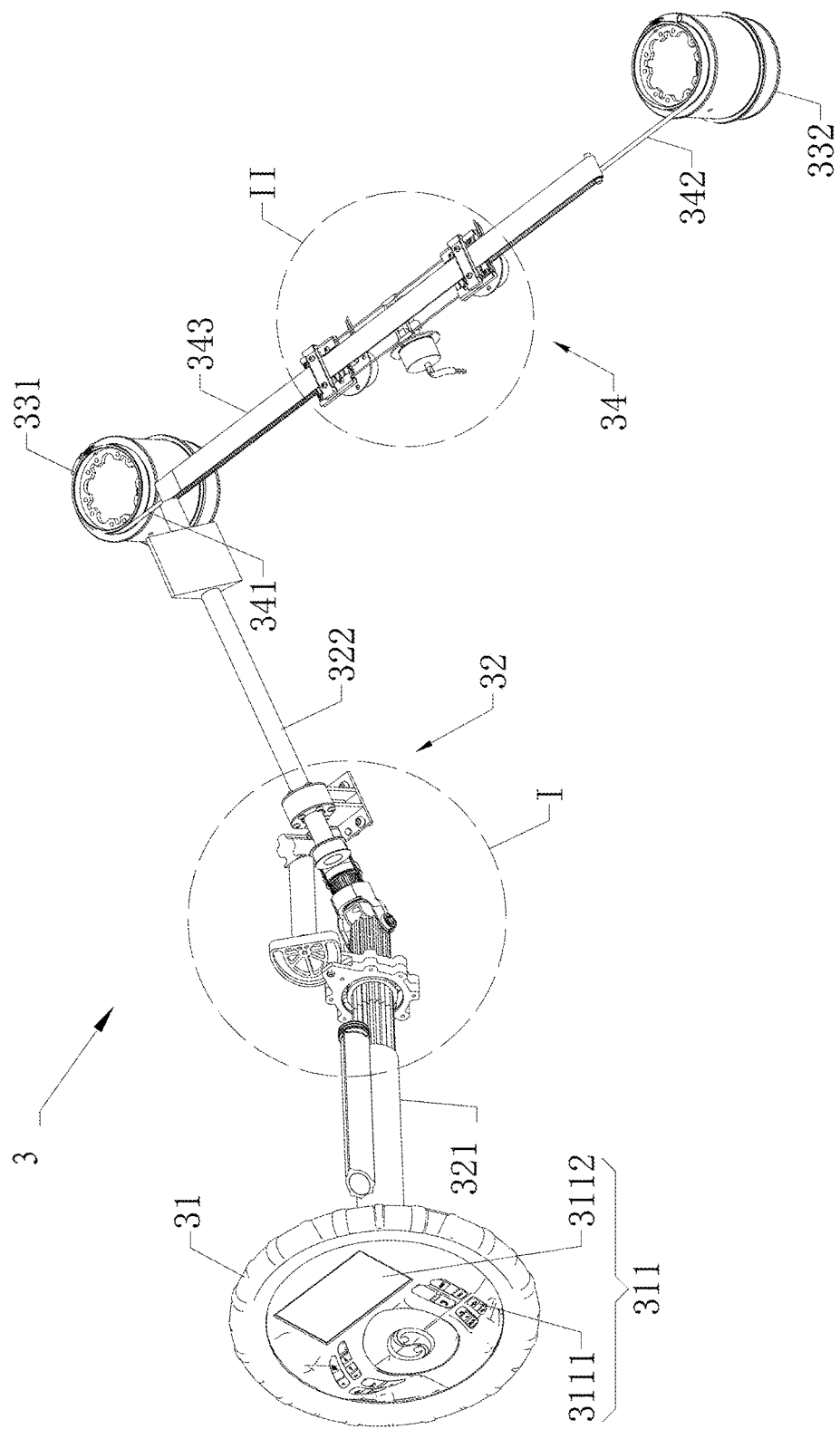
FIG. 12 is a top perspective view of the steering system of the electric vehicle chassis in FIG. 1.
Figure 13:
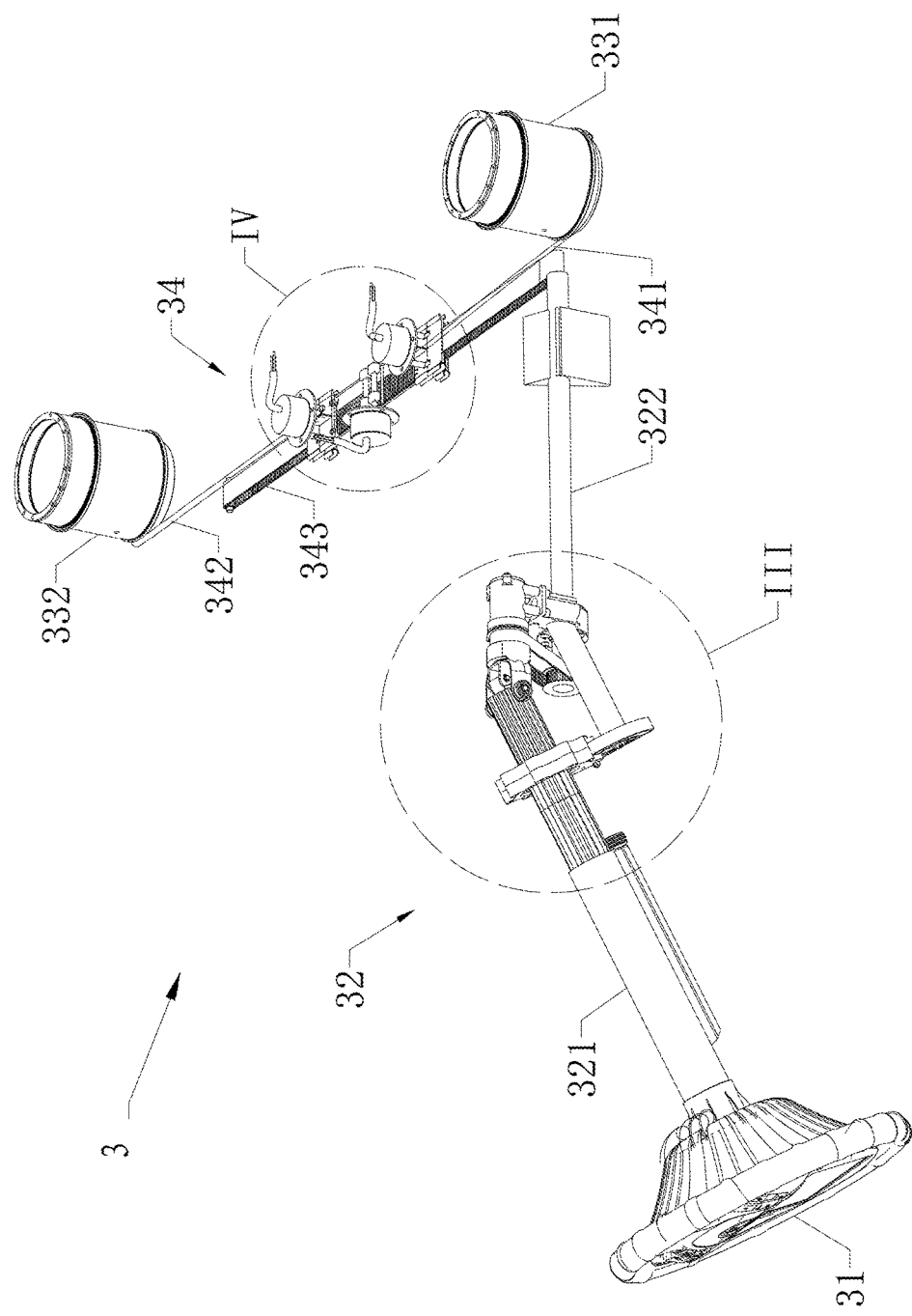
FIG. 13 is a bottom perspective view of the steering system in FIG. 12.

Referring to FIG. 2, FIG. 12 and FIG. 13, the steering system 3 configured to control the steering of the left front wheel 121 and right front wheel 122 of the vehicle, comprises: a steering wheel 31, a steering transmission device 32 configured to transmit a turning angle of the steering wheel 31, a left turntable 331 configured to adjust a turning angle of the left front wheel 121, a right turntable 332 configured to adjust the turning angle of the right front wheel 122, and a steering device 34 configured to control the turning angles of the left turntable 331 and the right turntable 332; the left turntable 331 is connected to the left front steering damping motor 131, and the right turntable 332 is connected to the front right steering damping motor 133. In this embodiment, the left turntable 331 is mounted in the left front steering damping motor 131, and the right turntable 332 is mounted in the front right steering damping motor 132.

The steering wheel 31 is connected to one end of the steering transmission device 32, the other end of the steering transmission device 32 is connected to the steering device 34, the left turntable 331 and the right turntable 332 are respectively disposed on both sides of the steering device 34.

The steering device 34 comprises a left steel wire rope 341, a right steel wire rope 342, and a synchronous belt 343 driven by the steering transmission device 32 to rotate, two ends of the left steel wire rope 341 are respectively wound on the left turntable 331 and the synchronous belt 343, and two ends of the right steel wire rope 342 are respectively wound on the right turntable 332 and the synchronous belt 343.

When the steering wheel 31 is turned, the turning angle of the steering wheel 31 is transferred to the synchronous belt 343 through the steering transmission device 32, the synchronous belt 343 drives the left steel wire rope 341 and the right steel wire rope 342 at the same time, the left steel wire rope 341 and the right steel wire rope 342 respectively adjust the turning angle of the left front wheel 121 and the right front wheel 122.

In present invention, the steering device 34 is mounted in the front beam 221, to be protected by the steering device 34. In other embodiments, the steering device 34 may be mounted outside of the front beam.

In the present invention, the synchronous belt 343 cooperates with the steering transmission device 32, and accurately drives the left turntable 331 and the right turntable 332 through the steel wires (the left steel wire rope 341 and the right steel wire rope 342 respective) and the winding manner thereof, and the turning angles of the left front wheel 121 and the right front wheel 122 are accurately controlled through the left turntable 331 and the right turntable 33. Further, the present invention is also the same as the conventional steering system 3, it is possible to implement the reverse rotation. The present invention has simple structure, low manufacturing difficulty, low manufacturing cost, high accuracy, and is convenient for the assembly of the vehicle and wheel (hub) thereof, such that the present invention is particularly suitable for electric vehicles.

Figure 15:
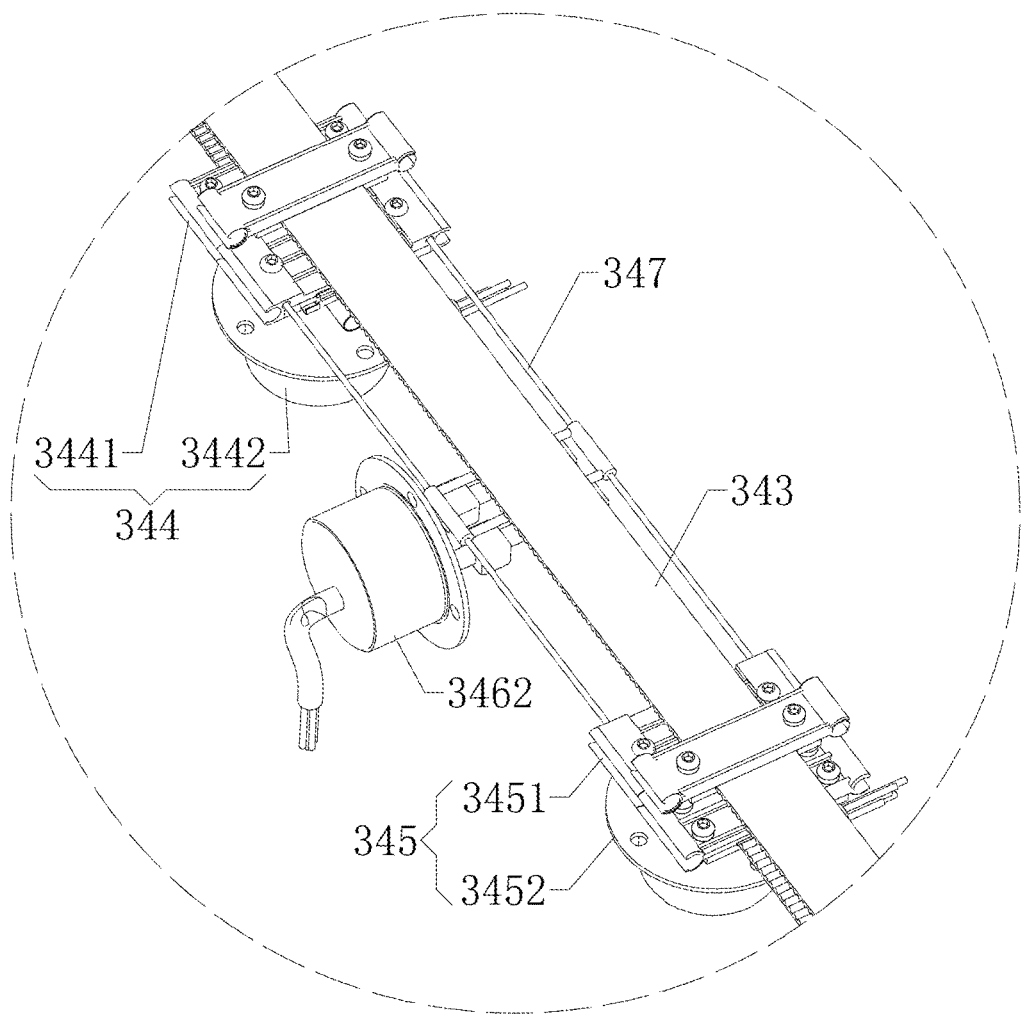
FIG. 15 is a partially enlarged view of II in FIG. 12.
Figure 17:
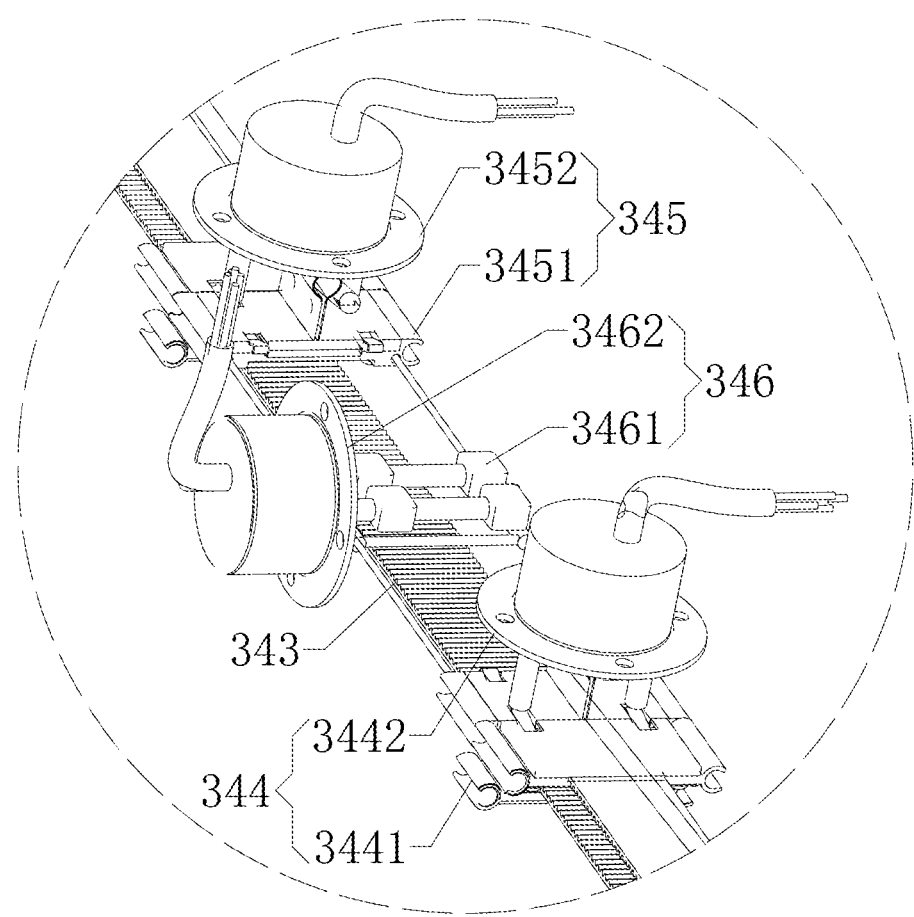
FIG. 17 is a partially enlarged view of IV in FIG. 13.

Referring to FIG. 15 and FIG. 17, the steering apparatus 34 also comprises a left synchronous belt locking member 344 configured to clamp the left steel wire rope 341 on the synchronous belt 343 or release the left steel wire rope 341 from the synchronous belt 343, a right synchronous belt locking member 345 configured to clamp the right steel wire rope 342 on the synchronous belt 343 or release the right steel wire rope 342 from the synchronous belt 343, the left synchronous belt locking member 344 and the right synchronous belt locking member 345 are disposed on the synchronous belt 343; the steering wheel 31 is provided with a control device configured to control the left synchronous belt locking member 344 and the right synchronous belt locking member 345. When the vehicle is normally used (that is, when moving forward), the left synchronous belt locking member 344 and the right synchronous belt locking member 345 respectively clamp the left steel wire rope 341 and the right steel wire rope 342 on the synchronous belt 343, such that the steering may be operated the same as the conventional vehicle in the present invention, the steering wheel 31 is rotated, the steel wire rope is driven by the synchronous belt 343, to accurately control the steering of the wheel indirectly. When the vehicle needs to be used unconventionally (that is, moving laterally at 90°), the driver operates the control device on the steering wheel 31, such that the left synchronous belt locking member 344 and the right synchronous belt locking member 345 respectively release the left steel wire rope 341 and the right steel wire rope 342 from the synchronous belt 343, at this time the steel wire ropes are not driven by the synchronous belt 343, then the control device processes control through the program, so that the left front wheel 121 and the right front wheel 122 are expanded outward, and eventually forms an angle of 180°, that is, the left front wheel 121 and the right front wheel 122 are in a straight line. We can know that the vehicle may travel laterally at this time, this traveling way is particularly suitable for parking, especially for narrow parking position. After the lateral traveling is completed, the left front wheel 121 and the right front wheel 122 is returned to their original positions through the control device, the left synchronous belt locking member 344 and the right synchronous belt locking member 345 respectively clamp the steel wire ropes again, so that the driving can be returned to routine status.

Continue referring to FIG. 15 and FIG. 17, as a specific embodiment of the left synchronous belt locking member 344 and the right synchronous belt locking member 345 of the present invention, the left synchronous belt locking member 344 comprises a left clamping block 3441 capable of clamping the left steel wire rope 3431 on the synchronous belt 343 and a left electromagnet 3442 configured to control a clamp state and an unclamp state of the left clamping block 3441, the left electromagnet 3442 is provided on the left clamping block 3441; the right synchronous belt locking member 345 comprises a right clamping block 3451 capable of clamping the right steel wire rope 342 on the synchronous belt 343 and a right electromagnet 3452 configured to control the clamp state and the unclamp state of the right clamping block 3451, the right electromagnet 3452 is provided on the right clamping block 3451. The clamping block cooperates with the electromagnetic to clamp and unclamp the steel wire ropes, the implementation method is simple and is easy to implement.

In particular, the steering device 34 also comprises a middle locking member 346 capable of simultaneously control distances of the left synchronous belt locking member 344 and the right synchronous belt locking member 345, the middle locking member 346 is disposed between the left synchronous belt locking member 344 and the right synchronous belt locking member 345, the left synchronous belt locking member 344 and the right synchronous belt locking member 345 are connected to the middle locking member 346 through a middle steel wire rope 347. In the embodiment of the present invention, the middle locking member 346 not only can control distances of the left synchronous belt locking member 344 and the right synchronous belt locking member 34, but also control the steel wire rope operational control, for example, control the turning angles of the left turntable 331 and the right turntable 332 indirectly, i.e., play an important role in the transition process between the above-described conventional driving and the transverse driving.

Referring to FIG. 17, as a specific embodiment of the middle locking member 346, the middle locking element 346 comprises a spool 3461 and a middle electromagnet 3462, the middle electromagnet 3462 is arranged on the spool 3461, the middle steel wire rope 347 is wound around the spool 3461.

Figure 14:
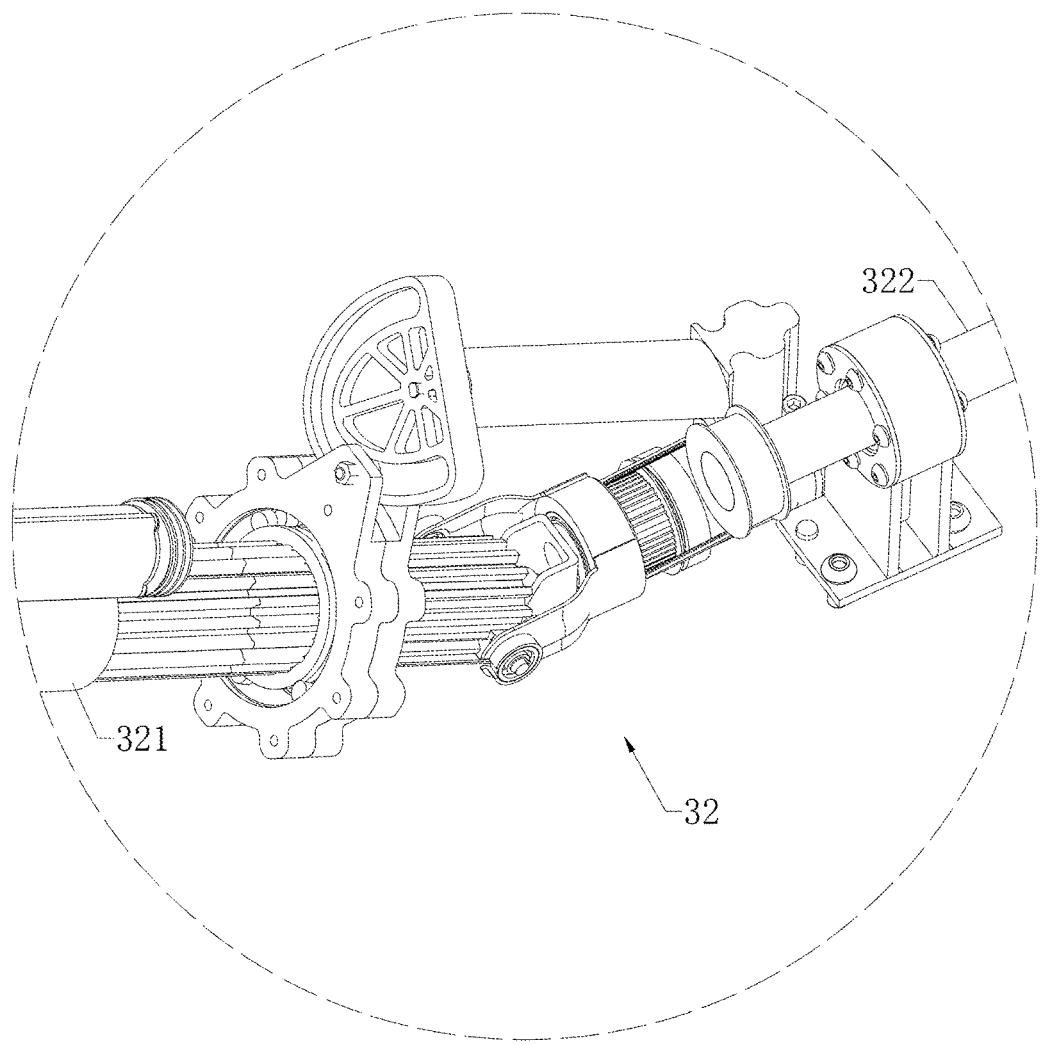
FIG. 14 is a partially enlarged view of I in FIG. 12.
Figure 16:
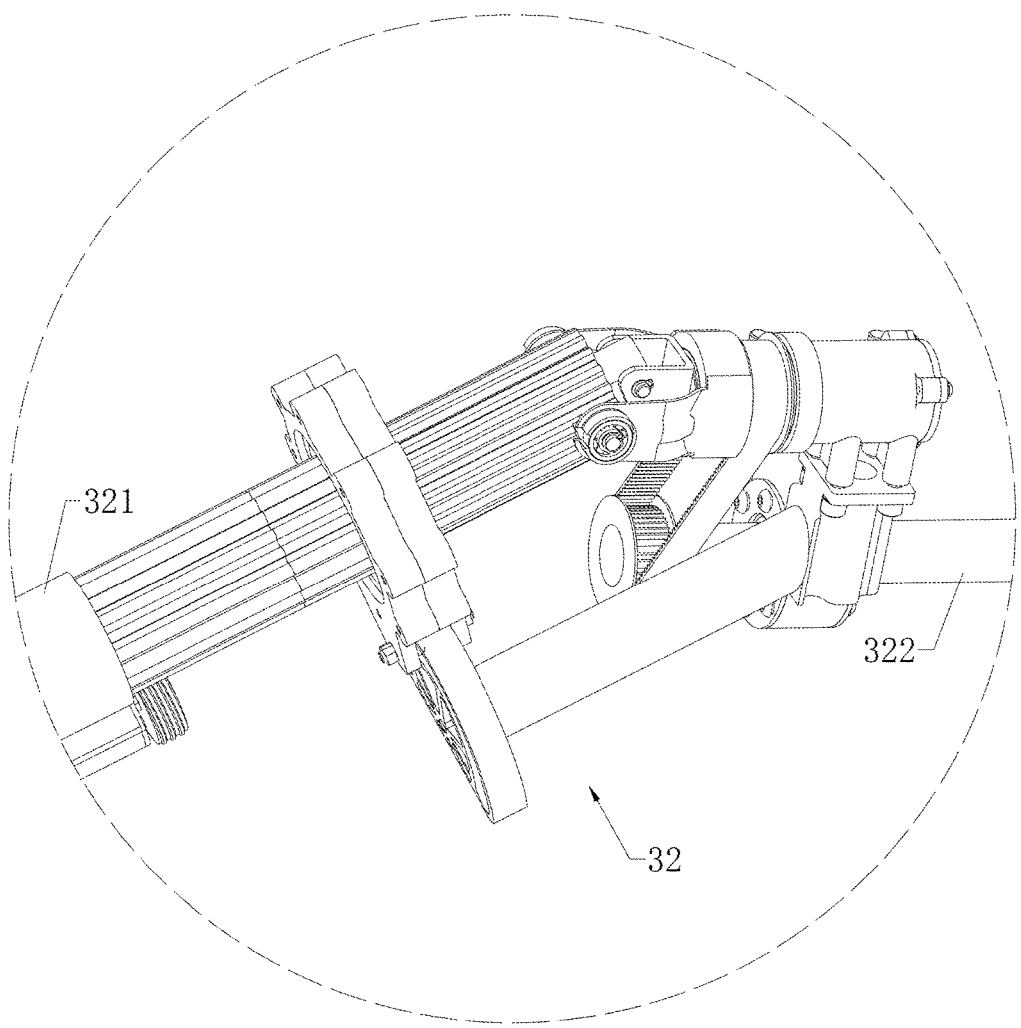
FIG. 16 is a partially enlarged view of III in FIG. 13.

Referring to FIG. 14 and FIG. 16, the steering transmission device 32 comprises a upper transmission shaft 321 and a lower transmission shaft 322, an upper end of the upper transmission shaft 321 is connected to the steering wheel 31, a lower end of the upper transmission shaft 321 is connected to the upper end of the lower transmission shaft 322, and the lower end of the lower transmission shaft 322 is cooperatively connected to the synchronous belt 343. In particular, the steering transmission device 32 of the present invention may be designed with reference to the existing steering transmission device, as long as the turning angle of the steering wheel may be transferred.

Specifically, the lower end of the lower transmission shaft 322 is provided with transmission teeth, and the synchronous belt 343 is provided with wavy teeth engaged with the transmission teeth.

Further, the steering wheel 31 is provided the control device configured to control the left front steering damping motor 131 and the right front steering damping motor 133. The left front steering damping motor 131 and the right front steering damping motor 133 are not only directly controlled by the left turntable 331 and the right turntable 332, but also indirectly controlled by the control device, such that the steering of the vehicle is more accurate.

Referring to FIG. 12, the control device 311 configured for overall is provided on the steering wheel 31, the control device 311 comprises a key 3111 and a display screen 3112. Wherein the control device may be specifically implemented a structural design and a control program design according to requirements, but is not limited to the form shown in the drawings, and therefore is not described in detail in this embodiment.

Embodiment of the present invention also discloses an electric vehicle using the electric vehicle chassis mentioned above. The electric vehicle chassis has light weight and simple structure, eliminates the need of the mechanical transmission system compared with the conventional vehicle, and has high power utilization efficiency.

The foregoing descriptions are merely exemplary embodiment of the present invention, but are not intended to limit the present invention. Any modification, equivalent replacement, or improvement made without departing from the spirit and principle of the present invention shall fall within the protection scope of the present invention.

What is claimed is:

1. An electric vehicle chassis comprising:
a frame system,
a steering motor damping system mounted on the frame system,
a wheel system connected with the steering motor damping system,
a steering system mounted on the frame system, and
a braking system mounted on the frame system,
wherein the wheel system comprises a left front wheel using a hub motor, a left rear wheel using a hub motor, a right front wheel using a hub motor, and a right rear wheel using a hub motor;
the steering motor damping system comprises a left front steering damping motor, a right front steering damping motor, a left rear steering damping motor and a right rear steering damping motor;
the left front steering damping motor and the right front steering damping motor are respectively disposed on a left side and a right side of a front end of the frame system, the left rear steering damping motor and the right rear steering damping motor are respectively disposed on the left side and the right side of a rear end of the frame system;
the left front wheel is connected with the left front steering damping motor, the right front wheel is connected with the right front steering damping motor, the left rear wheel is connected with the left rear steering damping motor, the right rear wheel is connected with the right rear steering damping motor;
the frame system comprises two multi-cavity box stringers spaced and symmetrically placed and made of aluminum alloy and a multi-cavity beam assembly made of aluminum alloy and connected between the two multi-cavity box stringers, an inner of the multi-cavity box stringer is provided with a plurality of independent cavities, the multi-cavity beam assembly comprises a plurality of beams each of which the inner is provided with a plurality of independent cavities, the multi-cavity box stringer comprises a middle portion and curved portions disposed on both ends of the middle portion, the curved portions are curved upward from the middle portion toward positions diagonally above two opposite inner sides of the two multi-cavity box stringers;
the beams comprise a front beam disposed on the front ends of the two multi-cavity box stringers, a rear beam disposed on the rear ends of the two multi-cavity box stringers, middle beams and combined beams all of which are disposed on the middle of the two multi-cavity box stringers, the number of the middle beams is two and the two middle beams are spaced, the number of the combined beams is two and the two combined beams are spaced, the left front steering damping motor and the right front steering damping motor are mounted on opposite ends of the front beam, the left rear steering damping motor and the right rear steering damping motor are mounted on the opposite ends of the rear beam; and
the middle beam comprises a base portion with the cross-section of inverted "Π" shape, and a rectangular portion provided on the base portion, the rectangular portion comprises a plurality of independent cavities.

2. The electric vehicle chassis of claim 1, wherein the combined beams are respectively formed by stacking two beams, the combined beams are axisymmetric, the two rectangle portions of the beams forming the respective combined beam are oppositely disposed.

3. The electric motor vehicle chassis of claim 1, wherein the frame system further comprises a middle fixing frame provided in the middle of the multi-cavity box stringer and configured to fix a middle column.

4. The electric motor vehicle chassis of claim 3, wherein the middle fixing frame comprises a U-shaped base portion, two arcuate portions provided on both ends of the U-shaped base portion, the two arcuate portions are bent outwardly, and the two arcuate portions are connected to the multi-cavity box stringers, the U-shaped base portion is provided with a rib in the middle.

5. The electric motor vehicle chassis of claim 1 further comprising a front anti-collision system provided at the front end of the multi-cavity box stringer, the front anti-collision system comprises a front crossbar connected with the front beam, a front bumper with two ends respectively connected to the front crossbar and the front beam, and the front bumper is curved, the front bumper is perpendicular to the front beam and the front crossbar, the front bumper is protruded outwardly with respective to the front crossbar.

6. The electric motor vehicle chassis of claim 5, wherein opposite inner sides of the front bumper are provided with front damping cushions.

7. The electric motor vehicle chassis of claim 5, wherein the ends of the front bumper are connected to the front beam through a shock-absorbing ring, at least one first lever is provided between the front crossbeam and the middle beam, the first lever is provided a first column.

8. The electric motor vehicle chassis of claim 1 further comprising a rear anti-collision system provided at the rear end of the multi-cavity box stringer, the rear anti-collision system comprises a rear crossbar connected with the rear beam, a rear bumper with two ends respectively connected to the rear crossbar and the rear beam, and the rear bumper is curved, the rear bumper is perpendicular to the rear beam and the rear crossbar, the rear bumper is protruded outwardly with respective to the rear crossbar.

9. The electric motor vehicle chassis of claim 8, wherein opposite inner sides of the rear bumper are provided with rear damping cushions.

10. The electric motor vehicle chassis of claim 8, the ends of the rear bumper are connected to the rear beam through a shock-absorbing ring, at least one second lever is provided between the rear crossbeam and the combined beam, the second lever is provided with a second column.

11. The electric motor vehicle chassis of claim 1, wherein the steering system comprises a steering wheel, a steering transmission device configured to transmit a turning angle of the steering wheel, a left turntable configured to adjust a turning angle of the left front wheel, a right turntable configured to adjust the turning angle of the right front wheel, and a steering device configured to control the turning angles of the left turntable and the right turntable; the steering wheel is connected to one end of the steering transmission device, the other end of the steering transmission device is connected to the steering device, the left turntable and the right turntable are respectively disposed on both sides of the steering device, the left turntable is connected to the left front steering damping motor, and the right turntable is connected to the front right steering damping motor.

12. The electric motor vehicle chassis of claim 11, wherein the steering device comprises a left steel wire rope, a right steel wire rope, and a synchronous belt driven by the steering transmission device to rotate, two ends of the left steel wire rope are respectively wound on the left turntable and the synchronous belt, and two ends of the right steel wire rope are respectively wound on the right turntable and the synchronous belt.

13. The electric motor vehicle chassis of claim 12, wherein the steering device further comprises a left synchronous belt locking member configured to clamp the left steel wire rope on the synchronous belt or release the left steel wire rope from the synchronous belt, a right synchronous belt locking member configured to clamp the right steel wire rope on the synchronous belt or release the right steel wire rope from the synchronous belt, the left synchronous belt locking member and the right synchronous belt locking member are disposed on the synchronous belt; the steering wheel is provided with a control device configured to control the left synchronous belt locking member and the right synchronous belt locking member.

14. The electric motor vehicle chassis of claim 13, wherein the left synchronous belt locking member comprises a left clamping block capable of clamping the left steel wire rope on the synchronous belt and a left electromagnet configured to control a clamp state and an unclamp state of the left clamping block, the left electromagnet is provided on the left clamping block; the right synchronous belt locking member comprises a right clamping block capable of clamping the right steel wire rope on the synchronous belt and a right electromagnet configured to control the clamp state and the unclamp state of the right clamping block, the right electromagnet is provided on the right clamping block.

15. The electric motor vehicle chassis of claim 13, wherein the steering device further comprises a middle locking member capable of simultaneously control distances of the left synchronous belt locking member and the right synchronous belt locking member, the middle locking member is disposed between the left synchronous belt locking member and the right synchronous belt locking member, the left synchronous belt locking member and the right synchronous belt locking member are connected to the middle locking member through a middle steel wire rope.

16. The electric motor vehicle chassis of claim 15, wherein the middle locking member comprises a spool and a middle electromagnet, the middle electromagnet is arranged on the spool, the middle steel wire rope is wound around the spool.

17. The electric motor vehicle chassis of claim 11, wherein the steering transmission device comprises a upper transmission shaft and a lower transmission shaft, an upper end of the upper transmission shaft is connected to the steering wheel, a lower end of the upper transmission shaft is connected to the upper end of the lower transmission shaft, and the lower end of the lower transmission shaft is cooperatively connected to the synchronous belt.

18. An electric vehicle, comprising the electric motor vehicle chassis of claim 1.

* * * * *